April 21, 1942.  A. J. DANIELS  2,280,142
GLAZING CONSTRUCTION
Filed Nov. 25, 1939  9 Sheets-Sheet 1

INVENTOR
Albert J. Daniels
BY J. Stanley Churchill
ATTORNEY

April 21, 1942.  A. J. DANIELS  2,280,142
GLAZING CONSTRUCTION
Filed Nov. 25, 1939  9 Sheets-Sheet 2

INVENTOR
Albert J. Daniels
BY J. Stanley Churchill
ATTORNEY

April 21, 1942.　　　A. J. DANIELS　　　2,280,142
GLAZING CONSTRUCTION
Filed Nov. 25, 1939　　　9 Sheets-Sheet 3

INVENTOR
Albert J. Daniels
BY J. Stanley Churchill
ATTORNEY

April 21, 1942.  A. J. DANIELS  2,280,142
GLAZING CONSTRUCTION
Filed Nov. 25, 1939  9 Sheets-Sheet 7

INVENTOR
Albert J. Daniels
BY J. Stanley Churchill
ATTORNEY

April 21, 1942.  A. J. DANIELS  2,280,142
GLAZING CONSTRUCTION
Filed Nov. 25, 1939   9 Sheets-Sheet 8

INVENTOR
Albert J. Daniels
BY J. Stanley Churchill
ATTORNEY

April 21, 1942. A. J. DANIELS 2,280,142
GLAZING CONSTRUCTION
Filed Nov. 25, 1939 9 Sheets-Sheet 9

Fig. 24

INVENTOR.
Albert J. Daniels
BY J. Stanley Churchill
ATTORNEY.

Patented Apr. 21, 1942

2,280,142

UNITED STATES PATENT OFFICE 2,280,142

GLAZING CONSTRUCTION

Albert J. Daniels, Shrewsbury, Mass.

Application November 25, 1939, Serial No. 306,106

14 Claims. (Cl. 189—64)

This invention relates to a building construction and more particularly to a glazing construction.

The invention has for an object to provide a novel and superior glazing construction in which the individual panels are supported in a novel manner such as to permit the panels to be erected from the interior of the building.

A further object of the invention is to provide a novel and superior glazing construction in which the individual panels are supported in a novel manner such as to permit the panels to be assembled from the interior of the building and in which the panel supporting members are permitted to expand or contract under varying atmospheric conditions so as to minimize liability of breakage of the panel or distortion of the structure.

With these general objects in view and such others as may hereinafter appear, the invention consists in the glazing constructions and in the various structures, arrangements and combinations of parts hereinafter described and particularly defined in the claims at the end of this specification.

In the drawings illustrating the preferred embodiments of the invention, Fig. 5 is a perspective view illustrating a detail of construction to be referred to; Fig. 6 is a perspective view similar to Fig. 1 and embodying the double glazing construction; Fig. 22 is a perspective view illustrating a detail of construction to be referred to.

In general, the present invention contemplates a novel glazing construction embodying uprights and horizontally arranged panel supporting members constructed in sections and provision is made for mounting the panel supporting members in a manner such as to permit the glass or other panels to be erected from the interior face of the glazing structure. This feature of the invention is of particular advantage in the construction of glazed side walls in high buildings, and is particularly useful in enabling panels to be easily and economically replaced.

Provision is also made for mounting the sections of the panel supporting members upon the uprights in a manner such as to permit movement of said sections with relation to the uprights upon expansion and contraction thereof, thereby minimizing panel breakage and distortion of the structure under varying atmospheric conditions.

Referring now to the drawings, the embodiment of the invention illustrated in Figs. 1, 2, 3, 5 and 7 comprises a single glazed structure of a type particularly adapted for industrial buildings and the like. In general, a series of upright fixed supporting members 10, preferably tubular in cross-section, are arranged to support individual panel sections 12, preferably of glass, between horizontal supporting members 14. The supporting members 14 are connected to the uprights 10 in a manner such as to suspend the panel sections thereon and to provide in effect a floating support for the panels 12 to permit relative movement thereof as will be described.

Provision is made for mounting the adjacent sections of the supporting members 14 upon the uprights 10 in a manner such as to permit the glass panels 12 to be inserted between the members 14 and secured in place from the interior face of the structure. As herein shown, each member 14 comprises an elongated section of fabricated sheet metal having an upper groove 16 adapted to receive the bottom edge of the glass panel formed by the upstanding walls 18, 20, joined at the bottom by the horizontally extended portion 22. The bottom groove 24 which is adapted to receive the top edge of a glass panel is only partially formed in the member 14 by the outer depending wall 26 and the horizontally extended portion 28, leaving the lower groove open on the inner face for a purpose to be described. In practice, the panel supporting members 14 are preferably constructed in sections of a length such that they may be erected to overlap upon the face of the uprights 10 to provide a space 30 between ends of adjacent sections thereof, see Fig. 5, and in some instances may be made of a length such as to extend across an intermediate upright so that the space 30 will occur only at alternate uprights.

As herein illustrated, the panel supporting members 14 are arranged to be snapped into place upon the outer face of the upright 10 and as herein shown, the latter are provided with snap-on clips 32 which may be secured to the uprights by bolts 34. The snap-on clips 32 may be equal in width to the uprights and are provided with horizontally extended portions 36, 38 which are arranged to be yieldingly received between the horizontally extended portions 22, 28 of the member 14 when the latter is urged into engagement therewith. The members 14 are secured in their assembled position by a vertical elongated cap member 40 which extends across adjacent panel supporting members and which are secured to the uprights 10 by through bolts 42. The through bolts 42 are received by a headed nut 44 extending through the inner wall of the upright as clearly shown in Fig. 2.

From the description thus far, it will be observed that provision is made for mounting the panel supporting members upon the uprights 10 and for clamping them in position against the outer face of the uprights by the cap members 40 and bolts 42. The structure is now in readiness to receive the panels 12. Referring now to Figs. 2, 7, 13 and 14, it will be observed that the glass panel 12 is slightly less in width than the width between adjacent uprights so as to permit the panel to be inserted therebetween and that the vertical edges of the glass panel may be provided with strips 46 of any suitable cushioning material such as asphaltic felt in order to form a weatherproof joint and a yielding support for the vertical edges. In erecting the structure, an individual panel is inserted between adjacent panel supporting members by introducing the lower edge of the panel into the groove 16 of one member 14. The upper edge of the panel is then placed in position against the inner surface of the depending wall 26 of the adjacent member 14, which as hereinbefore described, forms one wall of the bottom groove 24. The grooves 16 and 24 may be provided with suitable plastic material 50 in order to render the junctions between the panel 12 and the supporting members 14 weatherproof. It will be observed that the outer wall 18 of the member 14 is shorter than the inner wall 20 so that any rain water which might be collected in the groove 16 will run out over the top of the water wall 18 and thereby prevent any water entering through the structure.

Figure 13:
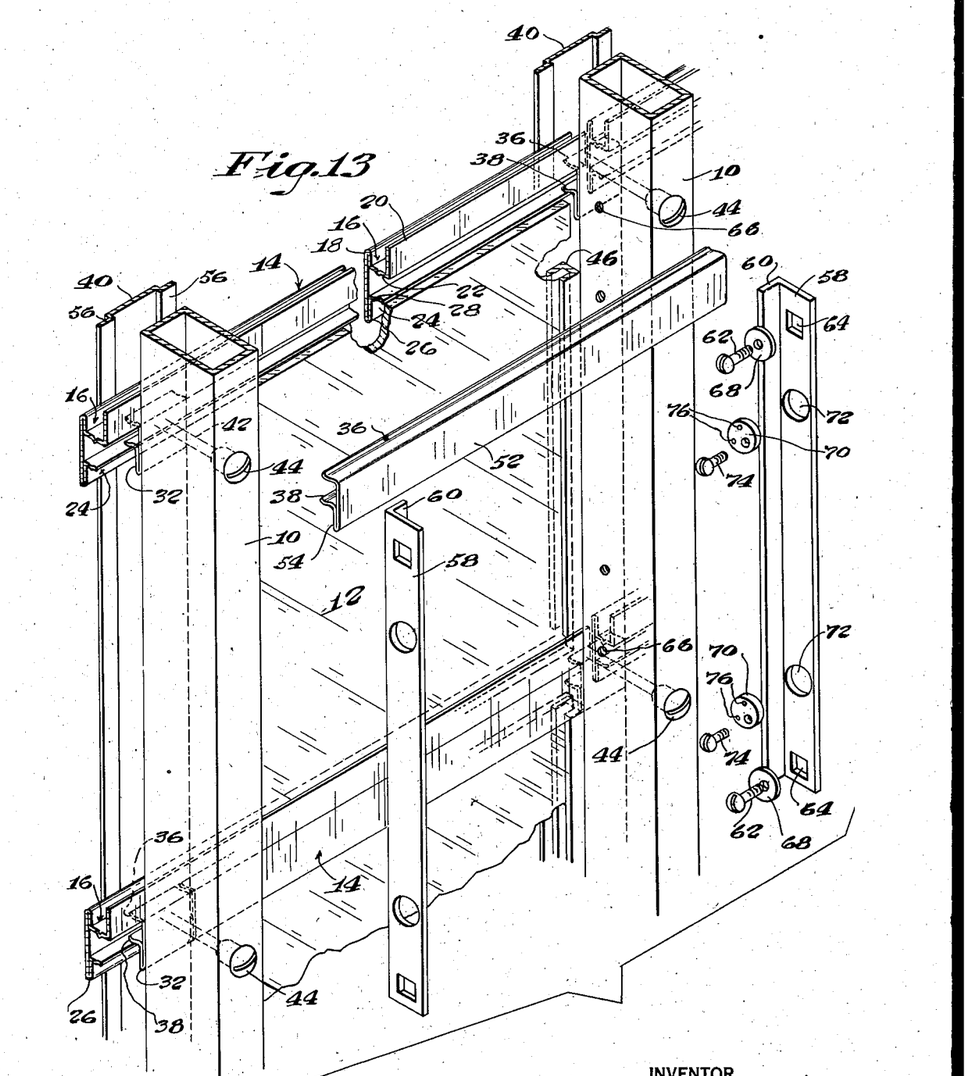
Fig. 13 is a perspective view as seen looking from the interior of a building and illustrating the manner of inserting and securing the individual panels from the interior.

As illustrated in Fig. 13, in the erection of the structure, provision is made for retaining the upper edge of the panel in assembled relation in the groove 24 and as herein shown, a snap-on retaining member 52 is provided which is arranged to snap into engagement with the panel supporting member 14 and to form the inner wall 54 of the groove 24. The retaining member 52 is of a length equal to or slightly less than the distance between two adjacent uprights and is the same shape in cross-section as the snap-on clips 32 so that when the member 52 is positioned in assembled relation, it forms in effect a continuation of such snap-on clips between adjacent uprights.

Figure 2:
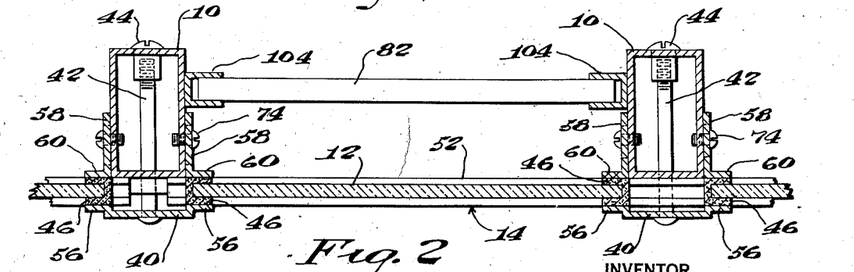
Fig. 2 is a plan view in cross-section on the line 2—2 of Fig. 1.
Figures 7, 8, 9, 10:
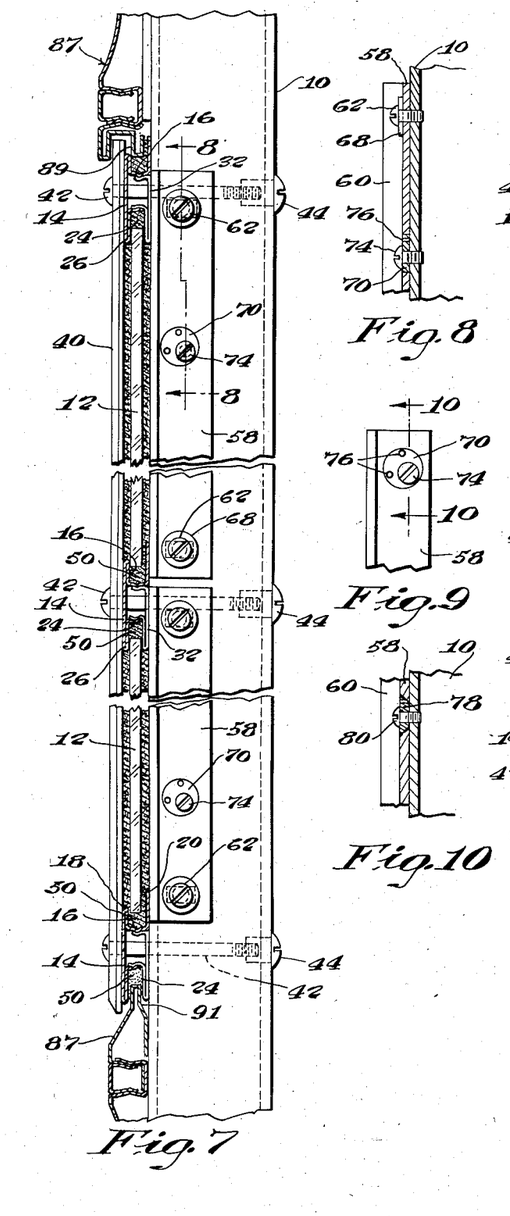
Fig. 7 is a longitudinal cross-section on the line 7—7 of Fig. 1.
Fig. 8 is a detail in cross-section on the line 8—8 of Fig. 7.
Fig. 9 is a detail of a modified form of one of the fastening members shown in Fig. 7.
Fig. 10 is a detail in cross-section on the line 10—10 of Fig. 9.
Figure 14:
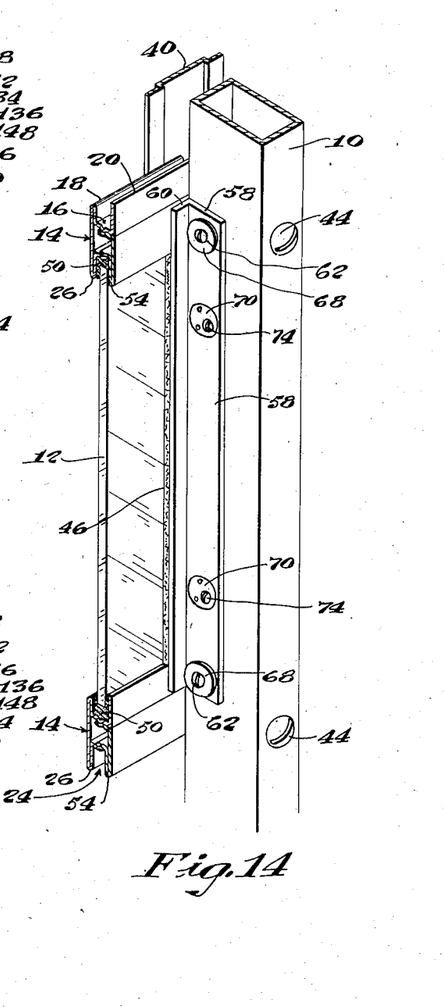
Fig. 14 is a perspective detail looking from the interior showing the parts assembled.

Referring now to Figs. 2, 7, and 13, it will be observed that the vertical edges of the glass, being provided with asphaltic strips 46, are arranged to bear against the flanges 56 of the outer cap member 40. In order to clamp the vertical edges of the glass against the flanges 56 and for securing the retaining members 52 in their assembled relation, angle members 58 are provided, each having one leg 60 arranged to bear against the inner vertical edge of the glass and against the retaining member 52, the other leg being bolted to the upright 10. The angle members 58 are made in sections arranged to extend vertically from one panel supporting member 14 to an adjacent member 14 and in overlapping relation therewith, and provision is made for urging the leg 60 of each angle member into clamping engagement with the vertical edges of the panel and their supporting members in cooperation with the flanges 56 of the cap member. As herein shown, see Figs. 13, 14, the angle members 58 are secured to the uprights 10 by screws 62 which extend through elongated holes 64 in the angle members, to permit lateral movement of the latter and into tapped holes 66 in the uprights 10. A washer 68 is provided under the head of each screw 62. In order to urge the angle member 58 into clamping engagement, a pair of eccentric disks 70 are provided which fit into openings 72 in the angle member and are secured to the upright 10 by screws 74. In assembling an angle member 58 to an upright 10, the screws 62 are first screwed loosely into the upright in order to retain the angle member in a loosely attached position and to permit the member 58 to be moved laterally into clamping engagement. Thereafter, the eccentric disks 70 are fitted into the openings 72 and attached to the upright 10 by the screws 74. The eccentric disks 70 may now be rotated on their pivots 74 to urge the angle member into tight fitting engagement. The eccentrics may be rotated in the usual manner by employing a suitable spanner wrench arranged to engage the holes 76 provided on the eccentric. Thereafter, the screws 62 are tightened up to secure the angle member in position, as shown in Fig. 14.

In some instances the angle members may be secured to the uprights as illustrated in Figs. 9 and 10. As therein shown, a pair of beveled eccentric disks 78 may be employed arranged to fit into countersunk openings in the angle member and which may be loosely attached to the uprights to retain the angle member in place. Thereafter, the eccentrics may be rotated as before and the screws 80 tightened. This modification eliminates the necessity of providing the screws 62 for retaining the angle member in place since the beveled disks 78 may be used for both clamping and fastening.

Figure 1:
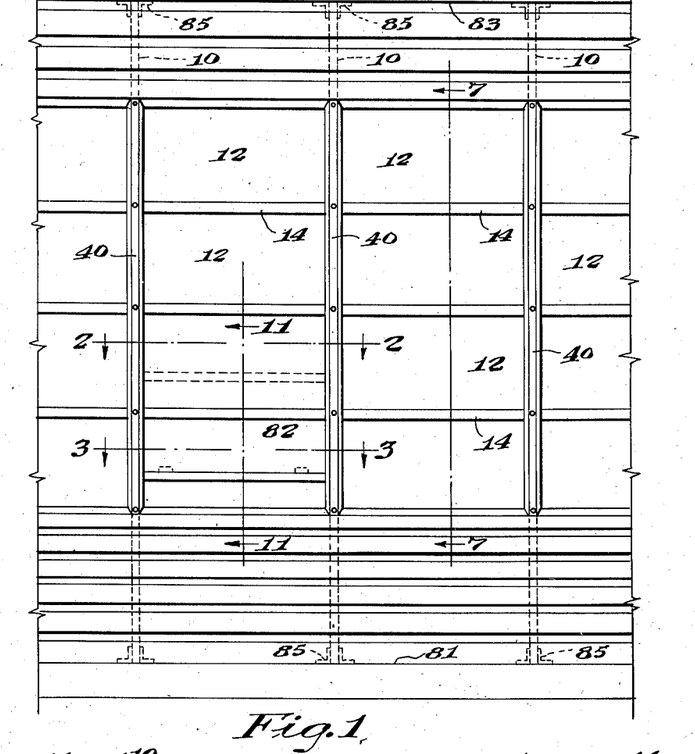
Fig. 1 is a front elevation of a portion of the side wall of a building embodying the present glazing structure.

In erecting the single glaze construction in a building, the vertical frame members 10 may be erected in spaced relation between the floor 81 and the ceiling 83 and may be secured thereto by suitable angle pieces 85, see Fig. 1. In the embodiment of the invention illustrated in Fig. 7, the sash is incorporated in the side wall between the usual metal siding 87 or other side wall construction. The siding may first be attached to the uprights in the usual manner, leaving an opening of the desired size for the glazing structure, and the siding may be provided with upper and lower flashing strips 89 and 91 respectively around the opening. As illustrated in Fig. 7, the lower flashing strip 91 is arranged to fit into the groove 24 of the lowermost panel supporting member 14 and the upper flashing strip 89 is arranged to fit into the groove 16 of the uppermost member 14. In assembling the glazed structure, the snap-on clips 32 are first attached to the uprights 10 in the proper spaced relation and in alignment with each other. The members 14 may then be snapped onto the clips 32 and the cap members 40 attached by the bolts 42 and nuts 44. The individual panels 12 may now be inserted between the members 14 by introducing the lower edge of a panel into a groove 16 and resting the upper edge of the panel against the wall 26 of the open groove 24 after providing the grooves with the plastic material 50 and affixing the weather strips 46 to the vertical edges of the panel. The snap-on retaining member 52 is then pressed into engagement with the member 14 whereupon the angle members 58 are secured in clamping engagement with the inner surface of the glazed structure. Thus it will be observed that the panels 12 may be erected from the interior of the building to provide an efficient, economical and weather-proof structure. It will be observed that when inserting the individual panel into a groove 16, the panel is raised above the inner wall 20 and lowered into the groove below the outer wall 18, the latter being of less height than the wall 20. This manner of inserting the panel is made possible by having the member 52 including the wall 54 of the groove 24 removably attached, as described.

From the description thus far, it will be observed that the adjacent sections of panel supporting members 14 are mounted upon the uprights 10 in a manner such as to permit movement of the sections under expansion and contraction thereof. As hereinbefore described, the sectional members 14 are arranged to snap onto the clips 32 and to overlap the uprights 10 leaving a space 30 between adjacent sections as clearly illustrated in Fig. 5. This construction permits endwise expansion and contraction of both the panel 12 and the members 14 due to the sliding engagement of the members 14 and the connecting clips 32. Expansion or contraction of the panels in a vertical direction is permitted by reason of the fact that the upper edge of each panel only partially fills the groove 24 providing ample space for movement of the panel. Thus each glazed section is, in effect, floatingly mounted between four fixed points of support, represented by the clips 32 at each corner which are arranged to permit the members 14 to slide endwise thereon to permit independent expansion or contraction of the parts of each section without subjecting the structure to bending strains. Furthermore, each individual panel 12 is floating between the grooves 16, 24 of the horizontal supporting members 14 thereby permitting expansion and contraction of a panel and its supporting members to take place at different rates according to the expansion characteristics of the material of which the parts may be composed.

Figure 3:
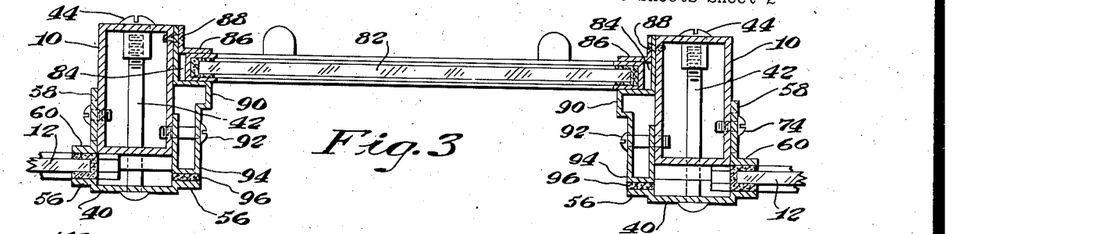
Fig. 3 is a plan view in cross-section on the line 3—3 of Fig. 1, showing a sliding panel.
Figure 11:
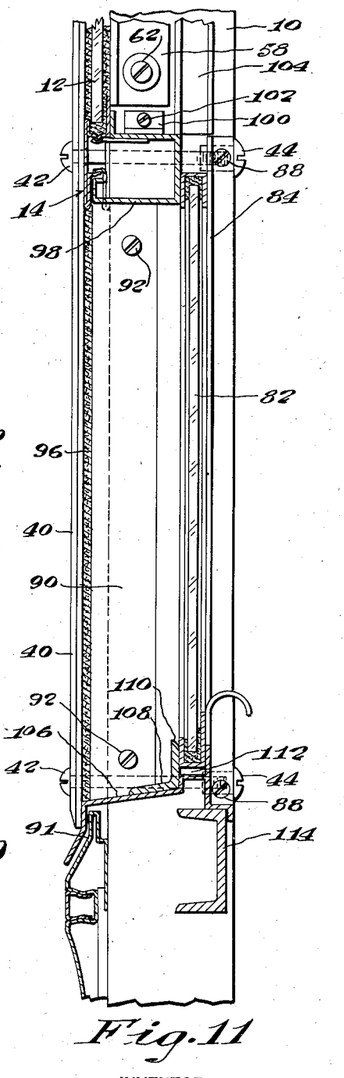
Fig. 11 is a longitudinal cross-section on the line 11—11 of Fig. 1, showing the sliding panel.

Referring now to Figs. 1, 2, 3 and 11, the present glazed structure may be provided with a sliding panel 82. The sliding panel may be arranged to extend between two adjacent uprights 10 and is preferably offset with relation to the fixed panels 12. As illustrated in Fig. 3 the sliding panel is arranged to slide in grooves 84 formed by angle members 86 attached to the uprights 10 by screws 88 and by jamb pieces 90 also attached to the uprights by screws 92. The forward edge 94 of the jamb piece 90 is arranged to cooperate with a flange 56 of the cap member 40, having a strip of cushioning material 96 interposed therebetween. As shown in Fig. 11, a head piece 98 extending between adjacent uprights and secured thereto by angle pieces 100 and screws 102, is formed to receive the adjacent panel supporting member 14. A guide 104 for the sliding panel is provided on the uprights above the head piece 98 to support the panel in its raised position. Any usual or preferred means may be employed for holding the panel in its raised position such as the usual sash weights, not shown. The lower edge of the sliding panel is arranged to cooperate with a sill piece 106 supported between the uprights and provided with an angle piece 108 forming the outer wall 110 of a groove 112 in which the lower edge of the panel is supported. The inner edge of the sill piece is supported upon a sill channel 114 extending between the uprights as clearly shown in Fig. 11. The outer edge of the sill piece 106 is arranged to receive the lower edge of the cap member 40 in overlapping relation and to extend over the flashing strip 91 forming the edge of the adjacent siding material.

Figure 4:
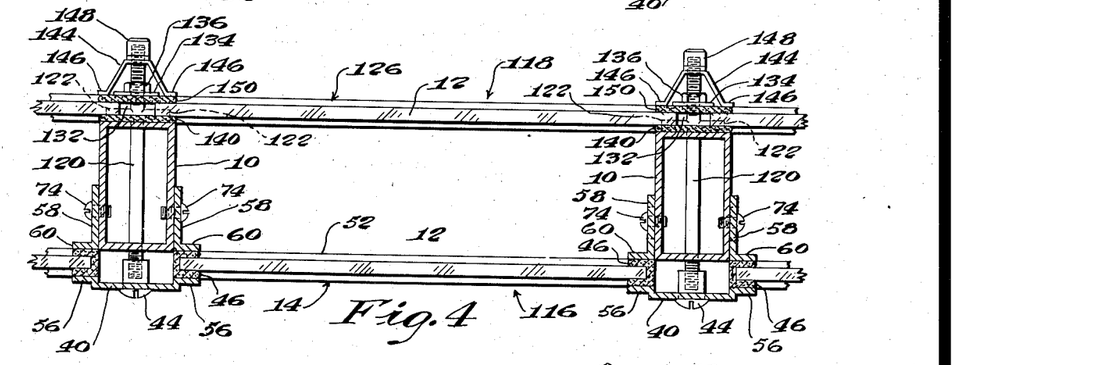
Fig. 4 is a plan view in cross-section illustrating a double glazed structure.
Figures 5, 6:
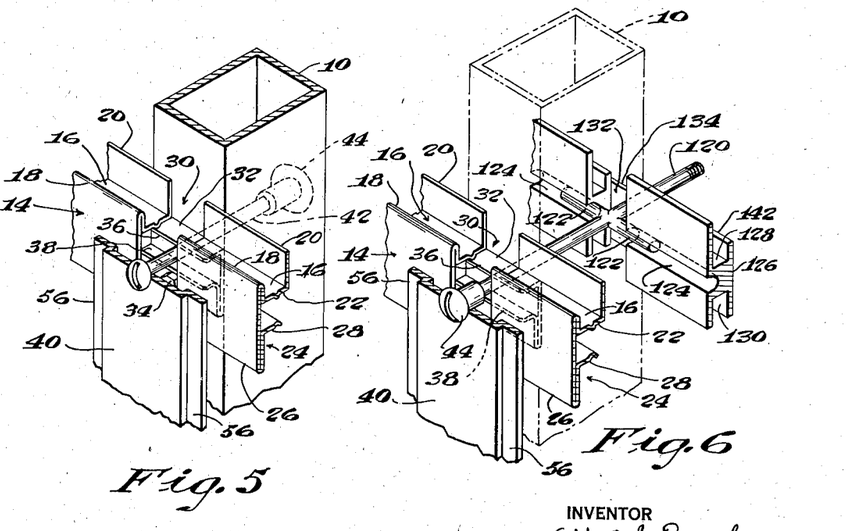
Figure 12:
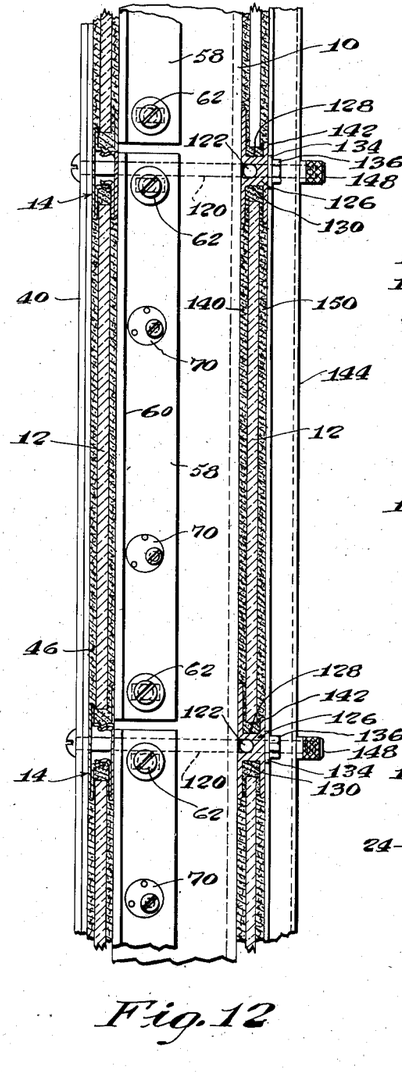
Fig. 12 is a side elevation in cross-section illustrating a double glazed structure.

As hereinbefore stated, the present invention may be embodied in a double glazed structure, and, as illustrated in Figs. 4, 6 and 12, such an embodiment may comprise an outer glazed section 116 supported upon the outer face of the uprights 10 and an inner glazed section 118 supported upon the inner face of the uprights 10. In the illustrated embodiment of the invention the outer section 116 may comprise a unit similar in construction to the single glazed structure hereinbefore described. However, in the double glazed construction a special cross-bolt 120 is preferably employed having horizontally extended and aligned portions 122 adapted to fit into grooves 124 provided upon one face of panel supporting members 126 for the inner glazed section 118. The panel supporting members 126 comprise extruded metal sections having grooves 128, 130 for the reception of the panels between adjacent members.

In erecting the double glazed structure the outer wall 116 is first assembled in the manner heretofore described in connection with the single glazed structure, leaving the cross-bolts 120 extending through the uprights 10 and with the aligned portions 122 arranged in horizontal alignment to receive the inner panel supporting members 126 as clearly shown in Fig. 6. The members 126 are made in sections arranged to overlap the uprights at their ends, leaving a space 132 therebetween. The members 126 are attached to the uprights by square washers 134 and nuts 136 which fit over the bolts 120, the washers 134 being in engagement with the ends of the members 126. When the nuts 136 are tightened up, the members 126 are clamped against the uprights 10 with the grooves 124 in engagement with the aligned portions 122. The panel receiving grooves 128, 132 may then be provided with suitable plastic material 138 in preparation for receiving a panel 12 and strips of suitable weatherproof material 140 are then laid against the uprights to form a yielding support for the edges of the panel, such strips extending vertically between the adjacent members 126. The individual panels 12 may now be inserted into the grooves by first introducing the upper edge of the panel into the deeper groove 130 a sufficient distance upwardly so that the lower edge of the panel may clear the shorter front wall 142 of the lower member 126. The panel may then be lowered into the groove 128 of the lower member 126 as illustrated in Fig. 12.

In order to cover the open spaces between the ends of adjacent panels 12 and between the adjacent sections of the supporting members 126, each upright 10 is provided with a cap member 144. As best shown in Fig. 4, each cap 144 is preferably of general U-shape in cross-section, with flanges 146 engaging the ends of the several pairs of panel supporting members 126. Each cap 144 is provided with a plurality of holes for receiving the projecting ends of the bolts 120, and the cap 144 may be securely positioned by knurled nuts 148 cooperating with the ends of the bolts 120. When securing a cap in position, suitable felt strips 150 are placed beneath the flanges 146 to fill the spaces between the flanges 146 and the panels 12 to provide a weather tight structure. Thus it will be seen that the invention may be embodied in a double glazed structure in which the panels may all be assembled from the interior of the building. Although, as herein illustrated, extruded metal panel supporting members 126 are preferably used in the construction of the inner section 118, it will be understood that panel supporting members 14 and snap-on clips 32 similar to those used for the outer section 116 may also be used in constructing the inner section 118 if desired. It will be seen that in both types of structure the panel supporting members are permitted to expand or contract under the influence of varying weather conditions. In the structure embodying the extruded metal type of panel supporting members 126, the latter are permitted to slide on the aligned portions 122 of the cross-bolt 120 under such conditions. It will also be observed that the glass panels 12 for the interior walls 118 may be made wider than the panels in the outer wall, since in the former case it is not necessary to fit the inner panels between the uprights 10. As herein shown, the inner panels may extend in overlapping relation to the uprights and may be of a width equal to the panel supporting members. As hereinbefore described, in some instances it may be desired to extend the panel supporting members across an intermediate upright in which case the panel supporting member may be fixed directly to the intermediate upright at the center of such panel supporting member whereby expansion or contraction may take place in a lateral direction toward or from either side of the center of the intermediate upright to which the panel supporting member is secured.

Referring now to Figs. 15, 16, 17 and 20, a modified embodiment of the present glazing structure particularly adapted for office, school or like buildings, is illustrated which may include a decorative, hollow metal column or covering 160 arranged to be detachably supported adjacent selected or all of the uprights supporting the glazed structure. The column 160 is designed so that it may be easily detached from the glazing structure and replaced by a metal partition wall 162 of standard construction, and commercially available for this purpose, whereby partitions may be erected or the location of such partitions changed at any time with minimum labor and expense and at the same time retaining the general design and architecture of the building. Both the column 160 and the partition 162 are designed to blend harmoniously with the glazing structure and to form a compact and finished unit therewith when assembled.

In the illustrated embodiment of the invention, referring particularly to the single glazed structure, see Fig. 15, the glazed wall indicated generally by the numeral 164 may comprise a structure similar to that heretofore described in connection with the embodiment illustrated in Fig. 7, including the panels 12 and panel supporting members 14 arranged to permit the introduction of the panels from the interior of the building. As herein shown, in the erection of the present structure, the panel supporting members 14 may be snapped into position upon the snap-on clips 32 and clamped to the upright by a relatively wide cap member 166 and short bolts 168 which extend through the outer wall of the upright and are secured thereto by nuts 170. Suitable spacers 172 may be provided between the upright and the cap member 166. The uprights 174 employed in the present embodiment are of general U-shape in cross-section, having laterally extended flanges 176 at the open end. As herein illustrated, the angle members 178 for clamping against the interior face of the glazed structure, adjacent the uprights 174, are secured to the uprights in a modified manner which may comprise a pair of eccentric disks or washers 180 secured to the upright by screws 182 which extend through an enlarged opening in the angle member. In assembling the angle member, the screws 182 are attached loosely to permit rotation of the eccentrics which are adapted to engage the leg 184 of the angle member and to urge the latter into clamping engagement with the structure when the eccentrics are rotated whereupon the screws 182 are tightened up to secure the parts in place.

Figure 16:
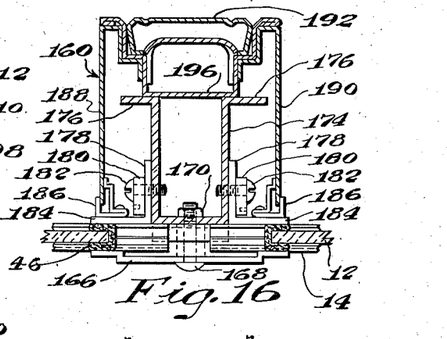
Fig. 16 is a plan view in cross-section taken on the line 16—16 of Fig. 15.
Figure 17:
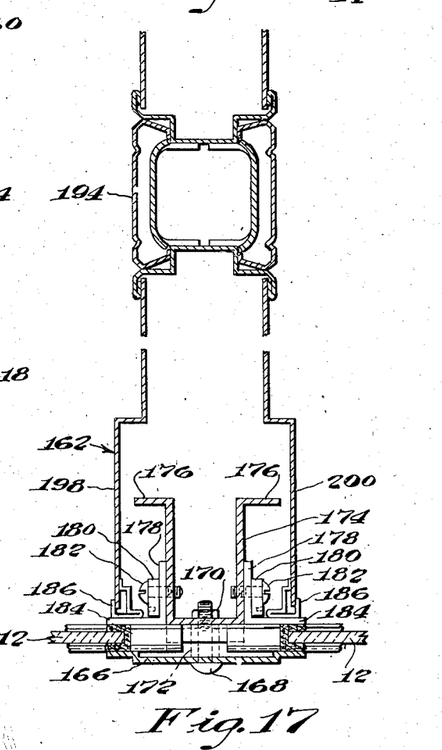
Fig. 17 is a view similar to Fig. 16 showing an interior partition in place of the removable covering.
Figures 18, 20:
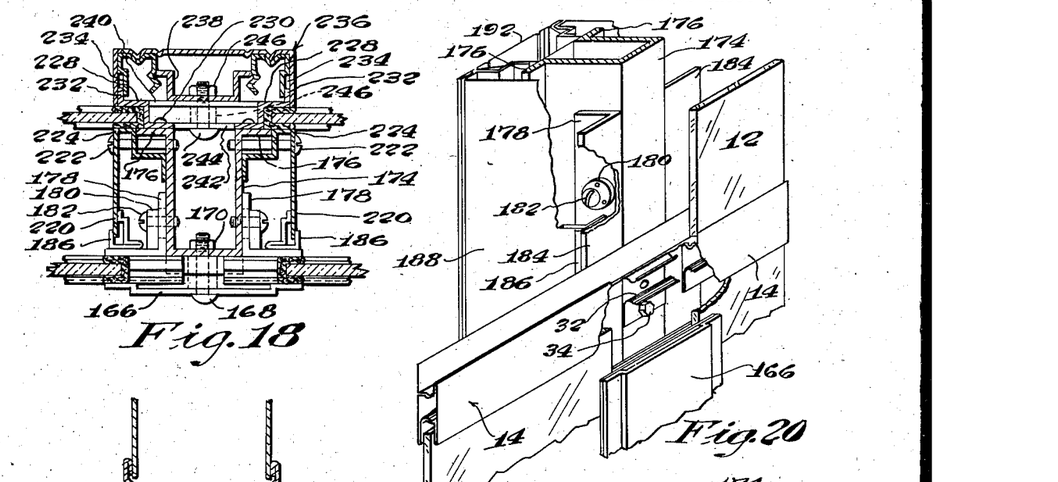
Figs. 18 and 19 are views similar to Figs. 16 and 17 respectively showing the decorative covering and partition wall as embodied in the double glazed structure.
Fig. 20 is a perspective view looking from the exterior face of the glazing structure with portions broken away to show the construction.

In order to detachably secure the column 160 to the glazed structure, a pair of elongated panel receiving members 186 are provided which may be welded or otherwise secured to the legs 184 of opposed angle members 178. The panel receiving members are provided with openings into which the opposed panel side walls 188, 190, of the column 160, are arranged to fit. The end wall 192 of the column may be provided with any suitable decorative design, preferably arranged to harmonize with adjacent partition columns 194 as shown in Fig. 17. The end wall 192 may be made up from individual sections pressed together in nesting relation as shown in Fig. 16 and one section 196 may be arranged to bear against the flanged portions 176 of the uprights 174. As herein illustrated, the column 160 may be removed from engagement with the elongated panel receiving members 186 and the metal partition wall 162, having opposed panels 198, 200 may be inserted into engagement with the panel receiving members when it is desired to erect a partition wall.

Figure 15:
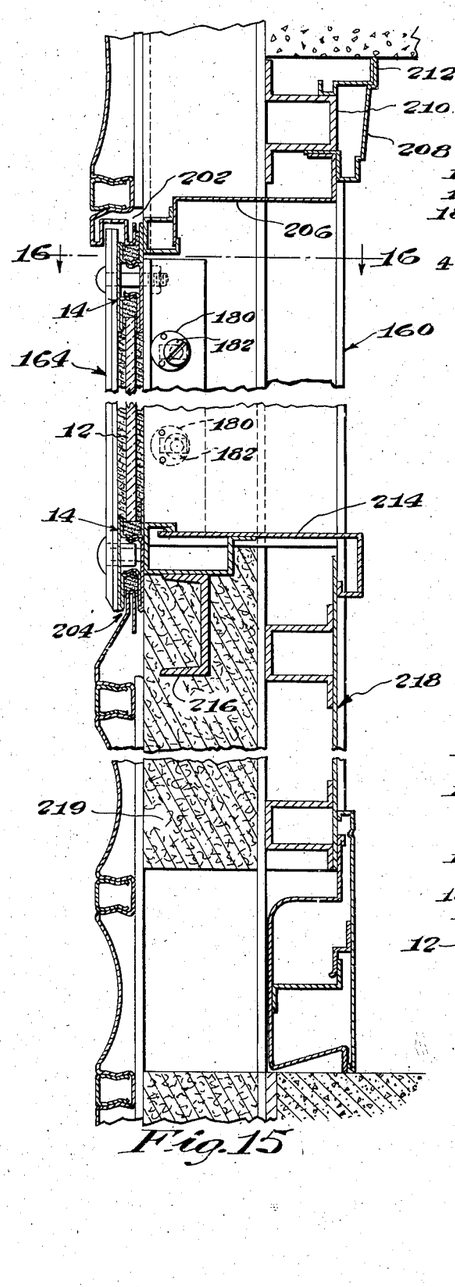
Fig. 15 is a side elevation in cross-section illustrating a modified form of the present glazing structure embodying a removable decorative covering for the vertical spaced supporting members of the present structure.

As herein shown, see Fig. 15, the upper and lower edges of the glazed wall 164 may be received by portions of the metallic or other siding as indicated at 202, 204, and the inner face of the wall may be provided with a soffit 206 arranged to extend inwardly from the upper edge of the structure to a cornice 208. The cornice may be supported upon a horizontally extended flanged channel member 210 and may be provided with a portion 212 in engagement with the ceiling. The column 160 may be cut out to fit snugly under the soffit 206 and in engagement with the cornice member as illustrated. The lower edge of the structure may be provided with a sill 214 arranged to be detachably supported upon a sill channel 216 and the space between the sill and the floor may be enclosed by any suitable paneled structure 218. The enclosed space, between the siding and the paneling may be provided with insulation 219, if desired.

Figure 24:
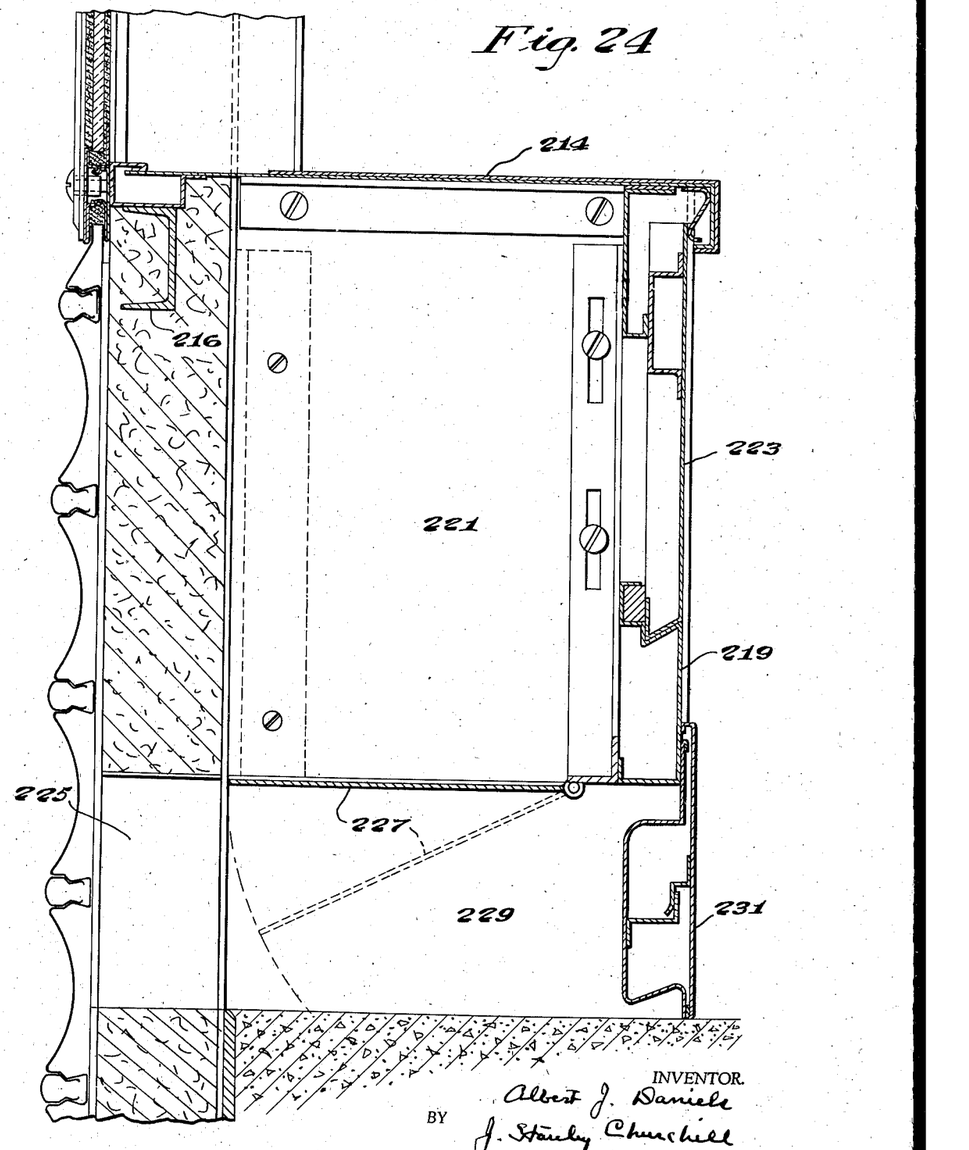
Fig. 24 is a view similar to Fig. 15 incorporating a sill structure for a purpose to be described.

In some instances, as illustrated in Fig. 24, the detachably supported sill 214 may be extended a substantial distance from the lower edge of the glazing structure and may be provided with a side wall 219 extending from the edge of the sill to the floor to form a continuous enclosed space along the wall. The space thus enclosed may be utilized for the heating pipes, electrical conduits or other conduits. Provision is made, as shown in Fig. 24, for utilizing the enclosed space 221 for air conditioning purposes. The side wall 219 which may be grilled to permit air to escape from the chamber 221. Suitable openings 225 may be provided in the outer wall to permit fresh air to enter from the outside. As herein shown, the bottom wall of the chamber 221 may be closed by a damper 227 which also forms the upper portion of a lower chamber 229. The base portion 231 of the side wall 219 may also be provided with grille work along sections thereof.

In practice, the above described construction affords several possibilities for treating the air entering from the outside. For example, when it is desired to heat the air being taken in through the opening 225, the damper 227 may be opened to permit the air to pass over heating pipes in the chamber 221 before it passes into the building through the grille 223. The air may be drawn in from the outside and directed over the heating pipes by suitable fans, not shown. In the hot weather, the air may be allowed to pass over cooling units before passing into the room. When the damper 227 is closed, the lower chamber 229 may be utilized as a duct to receive air from the outside through the opening 225 and through the grille work in the base portion 231. Instead of using the opening 225 in the side wall of the building to drawn in the air, the chambers or ducts 221, 229 may be provided with suitably treated air from any source, to be distributed throughout the building through the ducts.

Figure 19:
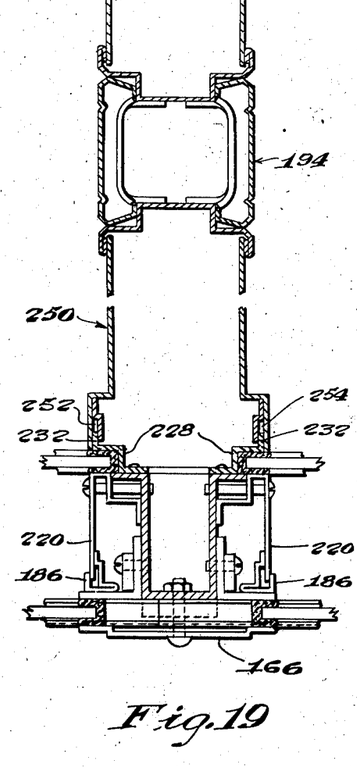
Figure 21:
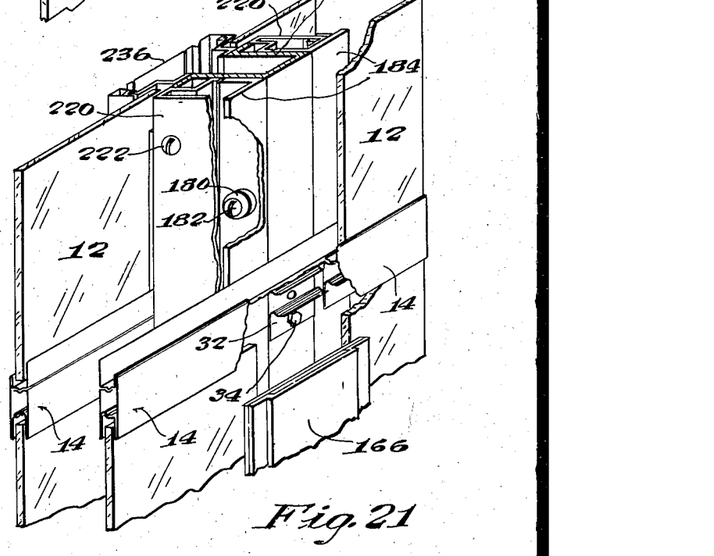
Fig. 21 is a similar view illustrating the double glazed structure.
Figure 22:
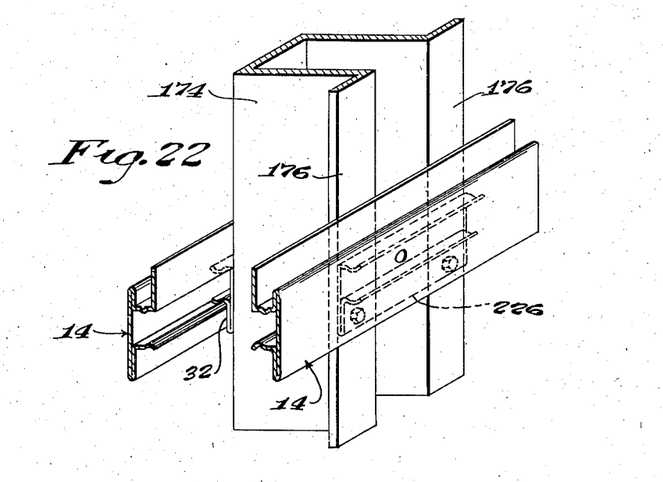

Referring now to Figs. 18, 19, 21 and 22, the modified embodiment of the invention, as above described, may be employed in connection with a double glazed structure, and as herein shown, the double glazed embodiment may comprise a pair of opposed panel receiving members 186 secured to the angle members 178 and which are arranged to receive metal panel members 220 extending between the exterior and interior walls of the glazed structure to cover up the upright 174 and to present a finished appearance. The metal panel members 220 may be secured to the upright by screws 222. It will be observed that portions 224 of the paneled members are disposed flush with the flanges 176 of the upright 174 to provide a surface against which the vertical edges of the glass panels of the interior walls may rest. As shown in Fig. 22, the panel supporting members 14 for the interior wall may be mounted upon the upright 174 by engagement with a relatively wide snap-on clip 226 secured to the flanges 176. In order to clamp the vertical edges of the glass panels against the flanges 176 and the portions 224, angular clamping members 228 are provided which may be secured to the flanges by screws 230. The angular clamping members 228 are provided with extended portions 232 which are arranged to be received within grooves 234 formed in a detachable metal cap member 236 corresponding to the column 160 of the single glazed construction. The cap member 236 may be made up in sections as illustrated in cross-section in Fig. 18 and may include a flanged channel member 238 provided with cross bars 240, 242 bolted thereto by bolts 244 and nuts 246. The cross bars 240, 242 are arranged in spaced relation being provided with a spacer 246 therebetween, and the cross bars 240, 242 are arranged to bear against the panel supporting members 14 and the upright flanges 176 respectively, at their ends. As shown in Fig. 19, the metal cap member may be detached from the glazed structure and replaced by a partition wall 250 which is provided with grooves 252, 254 adapted to receive the extended portions 232 of the clamping members 228.

Figure 23:
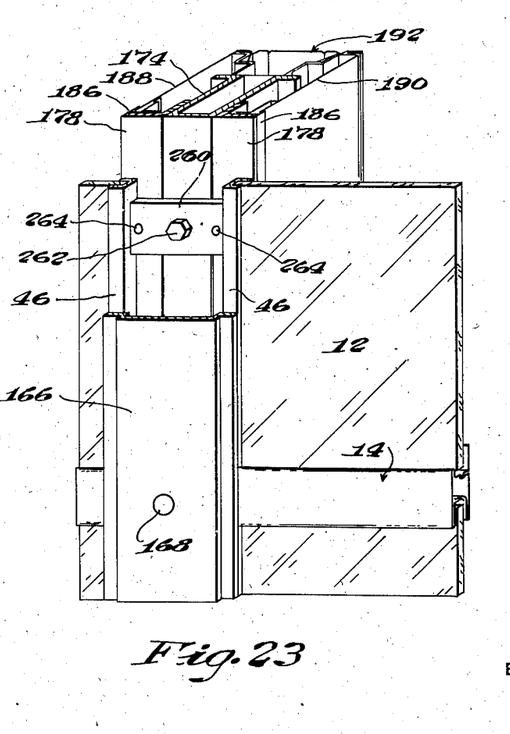
Fig. 23 is a perspective view looking from the exterior face of the glazing structure and illustrating a modified method of supporting the securing members as will be described.

As illustrated in Fig. 23, another modification of the means for supporting the angle members 178 may comprise a series of cross bars 260 secured to the face of the uprights 174 by bolts 262. The cross bars 260 may extend horizontally each side of the upright to provide surfaces against which the angle members 178 may be secured as by bolts 264. This method of assembly makes it unnecessary to use eccentrics or other clamping means, since the angle members may be drawn up by the bolts 264 into yielding engagement with the vertical edges of the glass panels.

Although the invention has been illustrated and described in connection with a glazing structure, it will be apparent the panels may comprise materials other than glass, such as of cementitious, resinous and other panel forming materials, and as used throughout the claims, the term "glass" is intended to include such equivalent panel materials. The panels may be provided with sound absorbing and heat insulating material attached to the inside surface thereof. The glazing construction is of such design that suitable ventilating ducts may be inserted in place of some of the panels. In practice, various combinations may be developed according to particular requirements, such as opaque panels along the lower portion of the wall and transparent panels in the upper portion with ventilating ducts placed at suitable intervals in the lower and upper sections, as required.

While the preferred embodiments of the invention have been herein illustrated and described, it will be understood that the invention may be embodied in other forms within the scope of the following claims.

Having thus described the invention, what is claimed is:

1. In a glazing construction, in combination, a plurality of upright supporting members, a plurality of vertically spaced horizontally extended panel supporting members, a plurality of panels supported beyond the outer faces of said upright supporting members, said upright supporting members being provided with means for restraining the side edges of the panels from outward movement, said horizontally extended supporting members being provided with means for restraining the top and bottom edges of the panels from outward movement and means detachably secured to said supporting members including means arranged to be snapped into cooperative relationship to said horizontal supporting members for restraining the panels from inward movement whereby to permit the panels to be erected from within the structure.

2. In a glazing construction, in combination, a plurality of upright supporting members, a plurality of vertically spaced horizontally extended panel supporting members, each horizontal member comprising a plurality of sections, said sections being of a length such as to overlap upon one of said upright supporting members and to provide a space between the ends of the adjacent sections, a plurality of panels supported beyond the outer faces of said upright supporting members, said upright supporting members being provided with means for restraining the side edges of the panels from outward movement, said horizontally extended supporting members being provided with means for restraining the top and bottom edges of the panels from outward movement, means detachably secured to said supporting members including means arranged to be snapped into cooperative relationship to said horizontal supporting members for restraining the panels from inward movement whereby to permit the panels to be erected from within the structure, and means for mounting said horizontally extended supporting members upon said vertically extended members, said means cooperating with said horizontally extended supporting members to permit relative movement thereof upon expansion and contraction.

3. In a glazing construction, in combination, a plurality of upright supporting members, a plurality of vertically spaced horizontally extended panel supporting members, each horizontal member comprising a plurality of sections, said sections being of a length such as to overlap upon one of said upright supporting members and to provide a space between the ends of the adjacent sections, a plurality of panels supported beyond the outer faces of said upright supporting members, said upright supporting members being provided with means for restraining the side edges of the panels from outward movement, said horizontally extended supporting members being provided with means for restraining the top and bottom edges of the panels from outward movement, means detachably secured to said supporting members including means arranged to be snapped into cooperative relationship to said horizontal supporting members for restraining the panels from inward movement whereby to permit the panels to be erected from within the structure, a plurality of fastening devices secured to said upright supporting members and to which said horizontally extended members may be snapped into assembled relation and slidably engaging the said horizontally extended supporting members to mount the latter upon the upright supporting members in a manner such as to permit relative movement thereof upon expansion and contraction.

4. In a glazing construction, in combination, a plurality of upright supporting members, a plurality of vertically spaced horizontally extended panel supporting members, each horizontal member comprising a plurality of sections, said sections being of a length such as to overlap upon one of said upright supporting members and to provide a space between the ends of the adjacent sections, a plurality of panels supported beyond the outer faces of said upright supporting members, said upright supporting members being provided with means for restraining the side edges of the panels from outward movement, said horizontally extended supporting members being provided with means for restraining the top and bottom edges of the panels from outward movement, means detachably secured to said supporting members including means arranged to be snapped into cooperative relationship to said horizontal supporting members for restraining the panels from inward movement whereby to permit the panels to be erected from within the structure, a plurality of clip members secured to the upright supporting members and to which said horizontally extended members may be snapped into assembled relation and adapted to cooperate with the overlapping ends of adjacent sections of the horizontally extended supporting members to mount the same on the upright supporting members in a manner such as to permit relative movement upon expansion and contraction.

5. In a glazing construction, in combination, a plurality of upright supporting members, a plurality of vertically spaced horizontally extended panel supporting members, each horizontal member comprising a plurality of sections, said sections being of a length such as to overlap upon one of said upright supporting members and to provide a space between the ends of the adjacent sections, a plurality of panels supported beyond the outer faces of said upright supporting members, said upright supporting members being provided with means for restraining the side edges of the panels from outward movement, said horizontally extended supporting members being provided with means for restraining the top and bottom edges of the panels from outward movement, means detachably secured to said supporting means including means arranged to be snapped into cooperative relationship to said horizontal supporting members for restraining the panels from inward movement whereby to permit the panels to be erected from within the structure, a plurality of fastening members secured to the upright supporting members and to which said horizontally extended members may be snapped into assembled relation and cooperating with the spaced adjacent ends of the horizontally disposed supporting members to insure alignment of said members and to permit relative movement lengthwise thereof upon expansion and contraction.

6. In a glazing construction, in combination, a plurality of upright supporting members, a plurality of vertically spaced horizontally extended panel supporting members, a plurality of panels supported beyond the outer faces of said upright supporting members, said horizontally extended supporting members being formed to provide grooves for the reception of the top and bottom edges of adjacent panels, and having one wall of the inner of the grooves detachably secured thereto whereby to permit the panels to be erected from within the structure and means for mounting said horizontally extended supporting members upon said vertically extended members comprising clips to which said horizontal members may be snapped into assembled relation.

7. In a glazing construction, in combination, a plurality of horizontally spaced upright supporting members, a plurality of vertically spaced and horizontally extended panel supporting members, each horizontal member being provided with an upper groove and a partially formed lower groove for the reception of the top and bottom edges of glass panels, means for mounting said horizontally extended supports upon the outer faces of said vertical supports, a plurality of panels supported by said horizontally extended supports between said upper grooves and said partially formed lower grooves, and a plurality of snap on members detachably engaging the inner face of said horizontal supporting members to complete said lower groove and to retain said panels, whereby said panels may be erected from the interior of the structure.

8. In a glazing construction, in combination, a plurality of upright supporting members, a plurality of vertically spaced horizontally extended panel supporting members, each horizontal member comprising a plurality of sections, said sections being of a length such as to overlap upon the outer faces of one of said upright supporting members and to provide a space between the ends of the adjacent sections, a plurality of panels supported by said supporting members, said upright supporting members being provided with means for restraining the side edges of the panels from outward movement, said horizontally extended supporting members being provided with means for restraining the top and bottom edges of the panels from outward movement, a plurality of detachable snap on members engaging the inner faces of said horizontally extended supporting members to restrain the panels from inward movement and means for clamping the panels into weather tight relation to the remainder of the structure.

9. In a glazing construction, in combination, a plurality of upright supporting members, a plurality of vertically spaced horizontally extended panel supporting members, each member comprising a plurality of sections, said sections being of a length such as to overlap upon one of said upright supporting members and to provide a space between the ends of the adjacent sections, a plurality of panels supported by said supporting members, said upright supporting members being provided with means for restraining the side edges of the panels from outward movement, said horizontally extended supporting members being provided with means for restraining the top and bottom edges of the panels from outward movement, a plurality of detachable members engaging the inner faces of said horizontally extended supporting members to restrain the panels from inward movement, and means for clamping the panels into weather tight relation to the remainder of the structure comprising a plurality of angle members mounted upon said upright supporting members and cooperating with said panels and rotatable eccentric means cooperating with the angle members and adapted upon rotation to urge the latter into clamping engagement with the panels.

10. In a glazing construction embodying a plurality of upright supporting members, horizontally extended panel supporting members mounted upon the outer faces of said upright supporting members and panels supported by said horizontally extended panel supporting members, vertical sash guiding means mounted on the adjacent faces of two of said upright supporting members and offset with relation to the aforesaid panels, a panel mounted to slide vertically in said guiding means, a head piece extended between the adjacent horizontal panel support and the upper portion of said slidable panel and a sill cooperating with the lower end of said slidable panel.

11. In a glazing construction embodying a plurality of upright supporting members, horizontally extended panel supporting members mounted upon the outer faces of said upright supporting members and panels supported by said horizontally extended panel supporting members, vertical sash guiding means mounted on the adjacent faces of two of said upright supporting members and offset with relation to the aforesaid panels, a panel mounted to slide vertically in said guiding means, a head piece extended between said two upright supporting members closing the space between the adjacent horizontal panel support and the upper portion of said slidable panel, a sill cooperating with the lower end of said slidable panel and a snap-on clip carried by the head piece cooperating with said adjacent horizontal panel support.

12. A double glazing structure having, in combination, a plurality of upright supporting members, a set of vertically spaced horizontally extended members for supporting the outer panels of the glazing structure, said members being sectional and some arranged to overlap upon the upright supporting members with their ends in spaced relation, means for restraining the outer panels from outward movement, detachable means for restraining the outer panels from inward movement whereby to permit the outer panels to be erected from within the structure, means for mounting the horizontal panel supporting members from the uprights including bolts extended through the uprights having lateral extensions upon the inner ends for cooperation with and for aligning the inner panel supporting members, a plurality of inner panel supporting members secured by said bolts to the rear face of said uprights and a set of panels supported by said inner panel supporting members.

13. In a glazing construction, in combination, a plurality of upright supporting members, a plurality of vertically spaced and horizontally extended panel supporting members, each horizontal member being provided with an upper groove and a partially formed lower groove capable of permitting the introduction of the top and bottom edges of panel from within the structure, means for mounting said horizontally extended supports upon the outer faces of said vertical supports, a plurality of panels supported by said horizontally extended supports between said upper grooves and said partially formed lower grooves, and a plurality of detachable snap on sections adapted to engage the inner face of said panel supporting members to complete said lower groove and to retain said panels in assembled relation.

14. In a glazing construction, in combination, a plurality of upright supporting members, a plurality of vertically spaced and horizontally extended panel supporting members, each member being provided with an upper groove and a partially formed lower groove capable of permitting the introduction of the top and bottom edges of panel from within the structure, means for mounting said horizontally extended supports upon said vertical supports, a plurality of panels supported by said horizontally extended supports between said upper grooves and said partially formed lower grooves, and a plurality of detachable sections adapted to engage the inner face of said panel supporting members to complete said lower groove and to retain said panels in assembled relation, and means for clamping the vertical edges of said panels into weather tight engagement with said structure, said last named means comprising a plurality of angle members carried by said uprights, and rotatable eccentric members in engagement with said angle members adapted upon rotation to urge the latter into clamping engagement with panels.

ALBERT J. DANIELS.